Oct. 21, 1930.  F. L. HAUSHALTER  1,779,235
RESILIENT SUPPORT
Filed Dec. 28, 1928   2 Sheets-Sheet 2
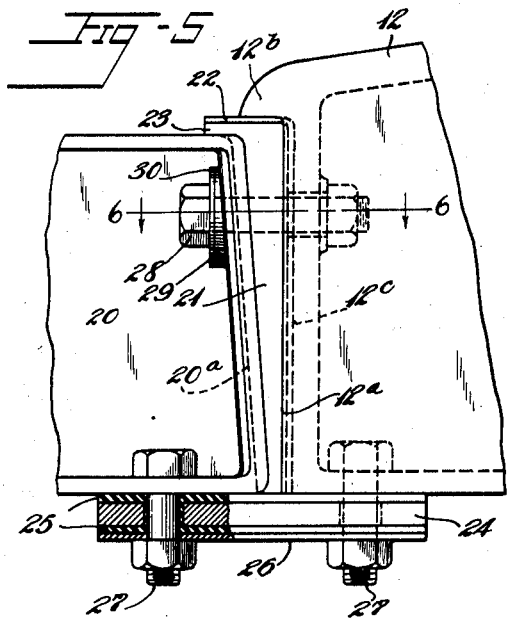
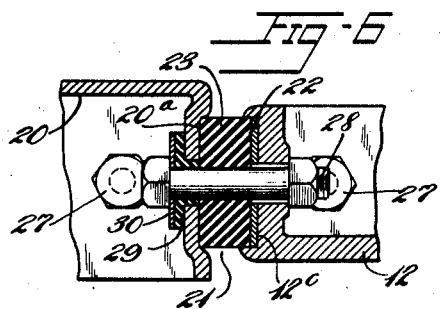
Inventor
Fred L. Haushalter
By Eakin & Avery
Attys.

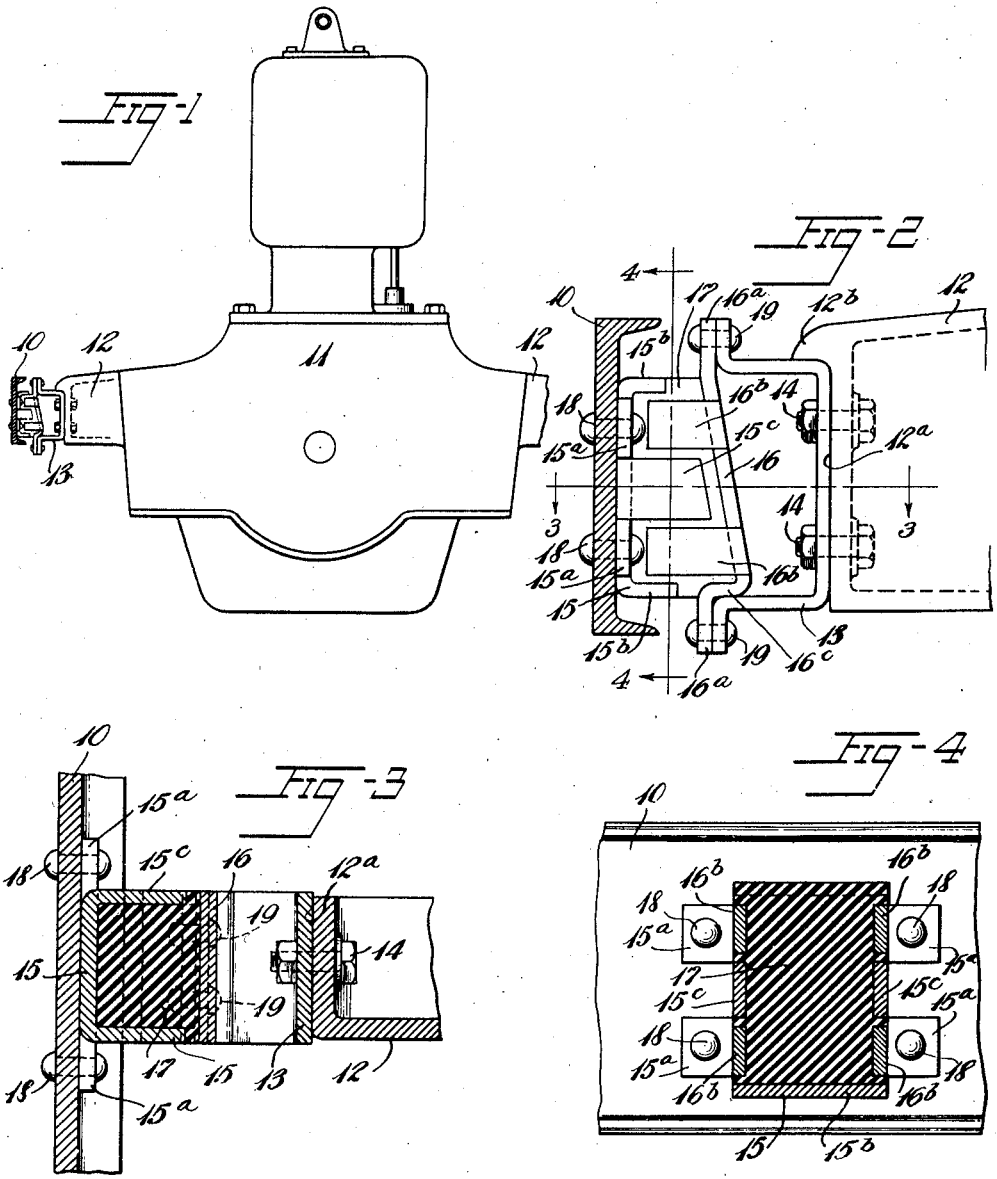

Patented Oct. 21, 1930

1,779,235

UNITED STATES PATENT OFFICE

FRED L. HAUSHALTER, OF AKRON, OHIO, ASSIGNOR TO THE B. F. GOODRICH COMPANY, OF NEW YORK, N. Y., A CORPORATION OF NEW YORK

RESILIENT SUPPORT

Application filed December 28, 1928. Serial No. 328,969.

This invention relates to resilient supports, and is of especial utility in supporting a part of an automobile, such as the motor, upon the chassis thereof, wherein a strong support is required yet where resilience is desired for absorbing road shocks and motor vibrations.

Among the chief objects of my invention are to provide an improved support having these characteristics, for a motor or the like; to provide a resilient support comprising rubber yet highly resistant to the deteriorating effect of oil which is usually present around motor supports; to provide a resilient support which will insure uniform cushioning of the supported structure throughout the life of the support; to provide a resilient support of such shape as to have progressively greater cushioning capacity toward the region of its structure where pressure becomes progressively greater; and to provide a resilient support which will permit universal movement of the supported member, yet still will support the latter upon failure of the resilient member.

Of the accompanying drawings:

Fig. 1 is an elevation of part of an automobile including the motor and side-frame, and my resilient support, in its preferred form, operatively associated therewith, a part being in section.

Fig. 2 is a side elevation, on a larger scale, of the resilient support and the adjacent parts of the automobile motor and frame.

Fig. 3 is a section on line 3—3 of Fig. 2.

Fig. 4 is a section on line 4—4 of Fig. 2.

Fig. 5 is a side elevation of a modified form of resilient support, a part being in section.

Fig. 6 is a section on line 6—6 of Fig. 5.

Referring to Figs. 1 to 4 of the drawings, 10 is one of the channeled frame members of an automobile chassis, and 11 is an internal combustion engine or motor supported thereby, the base-casting of the motor being formed with laterally projecting arms 12, 12 for supporting the motor from said frame members, and one of my improved resilient supports being positioned between each arm 12 and the frame. A two-armed bracket 13 comprising a part of the resilient support is secured to the end face 12ª of each supporting arm 12 by bolts or the like 14, 14, the arms of said bracket extending toward the resilient support and being permanently secured thereto. The arms 12 preferably are formed with shoulders such as the shoulder 12ᵇ which rests upon the upper arm of the bracket 13 to relieve the bolts 14 of the weight of the motor.

The resilient support comprises two spaced-apart, metal plates 15, 16 vulcanized to a tapered or wedge-shaped block or cushion of tough, resilient rubber 17. The plate 15 is formed with laterally extending ears 15ª, 15ª by which it is attached to the frame member 10 by rivets or the like 18, 18, and the plate 16 is formed at top and bottom with projecting ears 16ª, 16ª by which said plate is attached to the respective arms of the bracket 13 by rivets or the like 19, 19. The upper and lower end-portions 15ᵇ, 15ᵇ of the plate 15 are bent at right angles to the plate and lie flush with the top and bottom faces of the rubber cushion 17 to partly confine the same, and ears 15ᶜ, 15ᶜ, formed on the respective lateral margins of the plate 15 between the ears 15ª, 15ª are bent at right angles to the plate 15 and lie flush with the respective lateral faces of the rubber cushion 17 to confine a part of the latter.

The lateral margins of the plate 16 are each formed with a pair of spaced-apart ears 16ᵇ, 16ᵇ which are bent at right angles to the plate 16 and lie flush with the respective lateral faces of the rubber cushion 17, at each side of the ears 15ᶜ, 15ᶜ of the plate 15. The ears 15ᶜ and 16ᵇ of the plates 15, 16 are disposed in the same plane and are spaced somewhat apart from each other, the intervening spaces being occupied by the rubber of the cushion 17 as is most clearly shown in Fig. 4. The end-portions 15ᵇ of the plate 15 are of sufficient width laterally to extend beyond the nearer ends of the lateral ears 15ᶜ, 16ᵇ.

The tapered rubber cushion 17 is positioned with its greatest thickness at its bottom, and the plate 16, which follows the contour of said block so as to be disposed at an angle to the plate 15, has its lower end portion turned under a short distance as shown at 16ᶜ, Fig. 2, so as to lie flush with the bottom face of the rubber cushion 17. The arrangement is such that the ears 16ᵃ, 16ᵃ of the plate 16 are in the same vertical plane which allows the arms of the bracket 13 to be of the same length and strength.

The arrangement of the parts of the resilient support is such that when the support is mounted upon an automobile chassis and associated with a motor as shown in Figs. 1 and 2, the cushion 17 is held under compression by the wedging action of the plate 16 which is urged downwardly with relation to the plate 15 by the weight of the motor. Those portions of the cushion 17 which are disposed between the margins of the ears 16ᵇ, 15ᶜ, and between the ears 16ᵇ and lower end-portion 15ᵇ of the plate 15 are further compressed by the parts mentioned when urged toward each other by the weight of the motor, and serve to limit the wedging force of the motor. Since the cushion is under compression at all times, penetration thereof by oil which may come in contact with the structure is effectively resisted and rapid deterioration of the rubber is avoided.

The connection between the automobile chassis and motor is entirely of rubber, and arranged to cushion vibration of the motor in any direction. The intercalated arrangement of ears 16ᵇ, 15ᶜ, and end flanges 15ᵇ of the plates 15, 16 provides a safety feature which insures support for the motor in case of complete failure of the rubber cushion 17, which might occur after long use.

The tapered shape of the cushion 17 also has the effect of quickly damping or subduing the vibrations of the motor or chassis. This is so because the natural frequency of vibration being inversely proportional to the mass of the cushion, the tapered shape of the latter produces different frequencies of vibration in every part of its structure, with the result that resonance is avoided and the vibrations quickly neutralize one another.

The support is simple in construction and when mounted on a vehicle chassis permits a motor easily and quickly to be associated therewith. The arrangement and shape of its parts are such that shearing strains imposed during use are taken by the body portion of the cushion and not at the junction of cushion and metal plates so that early separation of the cushion and plates is avoided.

Referring to the modification shown in Figs. 5 and 6, the frame of the automobile is provided with inwardly extending brackets, such as the bracket 20, and the end face of said bracket is sloped or inclined downwardly toward the motor 11, and is formed with a central groove 20ᵃ extending from its top to bottom. The height of the bracket 20 is substantially less than the height of the end face 12ᵃ of the arm 12 of the motor 11, and said end face 12ᵃ is formed with a central groove 12ᶜ extending from its top to bottom.

An L-shaped cushion member 21 comprising a metal backing or reinforcing strip 22 and a tapered resilient rubber cushion 23 vulcanized thereto is mounted with its long leg in the space between the bracket 20 and motor arm 12, the metal portion 22 resting in the groove 12ᶜ of the motor arm and the tapered rubber portion 23 resting in the groove 20ᵃ in the sloped end-face of the bracket 20. The short leg of the member 21 rests upon the top face of the bracket 20 between latter and the under face of the shoulder 12ᵇ of the motor arm 12.

For aligning the several motor-arms 12 with the brackets 20, and to provide a cushioned though positive safety connection between the same, I provide connecting-plates, such as the metal plate 24 which has its opposite faces covered with rubber 25 and having a wear-plate 26 vulcanized to the rubber on one face. The plate 24 is provided with rubber-lined bolt-holes and is secured to the under side of the bracket 20 and arm 12 by bolts 27, 27.

The motor arm 12, bracket 20, and cushion member 21 preferably are bolted together as by a bolt 28 which extends through aligned apertures in said members, the aperture in the bracket 20 being provided with a resilient rubber bushing 29 having a radial flange or cushion which bears against the sloping wall of the bracket 20 and has a washer 30 secured to its face which is engaged by the head of the bolt 28.

The arrangement is such that the rubber of the tapered portion of the cushion member 21 is held under compression, in a wedging action, by the weight of the motor 11, and excessive compression of said cushion member is prevented by the cushioned stop afforded by its short leg which rests upon the top of the bracket 20 between the latter and the shoulder 12ᵇ of the motor arm 12. Bouncing and misalignment of the motor are prevented by the cushioned bolts 27, 28, while vibration of the chassis or motor is damped or neutralized by the tapered shape of the cushion member in the manner of the preferred embodiment of the invention.

My invention provides a simple and effective device by means of which the objects of the invention, as set forth in the statement of objects, are accomplished, and the modification provides the additional advantage of cushioning the twisting movement of the chassis frame member caused by the weight of the motor, with a rubber cushion which is progressively thicker, and consequently of greater cushioning capacity, toward the region where pressure upon the cushion, due to said twisting movement, is greatest.

Other modifications may be resorted to without departing from the scope of the invention as defined by the appended claims.

I claim:

1. In a device of the character described, the combination of a supporting structure, a structure supported thereby, and a resilient cushion member mounted between said structures, said cushion member being of such tapered shape as to have natural rates of vibration of different frequencies within its structure so that sympathetic vibration in the cushion member as a whole is to an appreciable extent avoided and the said structure having extensive contact with the taper face of the cushion member for support of the supported structure.

2. In a device of the character described, the combination of a supporting structure, a structure supported thereby, and a cushion member of resilient, deformable material having a sloping face and of non-uniform horizontal section positioned between said structures and held under compression by a wedging action of the weight of the supported structure against the said sloping face.

3. A combination as defined in claim 2 including cushion means for limiting the wedging force of the supported structure.

4. A resilient support adapted to be positioned between a supporting and a supported structure, said support comprising a tapered resilient cushion, and metallic members vulcanized to the taper face of said cushion and connecting the same to said supporting and supported structures.

5. A resilient support as defined in claim 4 in which said metallic members are formed respectively with extensions disposed in intercalated relation to each other.

In witness whereof I have hereunto set my hand this 14th day of December, 1928.

FRED L. HAUSHALTER.